United States Patent Office 3,535,890
Patented Oct. 27, 1970

3,535,890
METHOD OF MAKING FUSED SILICA
Kent W. Hansen and Harrison P. Hood, Corning, N.Y., assignors to Corning Glass Works, Corning, N.Y., a corporation of New York
No Drawing. Filed Oct. 26, 1967, Ser. No. 678,192
Int. Cl. C03b 23/20
U.S. Cl. 65—18                                    9 Claims

ABSTRACT OF THE DISCLOSURE

A method for producing a clear, fused silica article having a nonporous structure whereby the free water of an aqueous dispersion of colloidal silica particles is evaporated under controlled relative humidity conditions to form a porous body of silica which is then impregnated with a halogen reagent to remove bound water and finally consolidated by sintering to produce a fused silica article, having a nonporous structure.

---

Silica glass or fused silica, is the most important of the single-oxide glasses. It is characterized by a high use-temperature, a low coefficient of thermal expansion, and a very low ultrasonic absorption. Moreover, it is an excellent dielectric and is highly resistant to chemical attack. Silica glass is used in ultrasonic delay lines, as supersonic wind tunnel windows, in optical systems for spectrophotometric measuring instruments, and as crucibles for growing germanium or silicon crystals.

This glass may be made directly by melting crushed quartz or sand. However, silica is difficult to melt because it requires very high temperatures and is so viscous that bubbles formed during melting do not rise through the molten glass. Special methods not requiring these excessively high temperatures have been developed to manufacture silica glass, such as by use of vapor deposition techniques. Nevertheless, the viscosity characteristics of fused silica still make forming into variously shaped articles very difficult.

Quite surprisingly, we have discovered a method for making fused silica at temperatures significantly below the normal melting temperatures of crushed quartz while simultaneously forming a shaped article. The fused silica product is equivalent to that prepared by conventional techniques and has similar utility. Our method involves broadly the replacement of alkali from an alkali silicate in aqueous suspension, the evaporation of the free water, then the removal of the bound water to leave a substantially dried silica body, and finally consolidation of the body at elevated temperatures.

In accordance with the present invention, we have discovered a method of making a fused silica body comprising evaporating water from an aqueous dispersion of colloidal silica particles stabilized with a sufficient amount of ammonia and which contains a maximum amount of alkali equal to about 0.05% by weight of the total solids. During evaporation of the dispersion a container must be used which offers no resistance to shrinkage of the gel during drying. There should also be substantial absence of any mechanical shock from the time the gel is formed until the water has evaporated and the gel has solidified to a porous body. After evaporation of the free water, the porous body is similar in characteristics to porous 96% silica glass resulting from the leaching of a borosilicate glass. Thereafter, the porous body is subjected to a drying procedure to remove bound or residual water by treating the body with a reagent containing a halogen selected from the group consisting of chlorine and fluorine. Finally the porous material which is now substantially dry, is consolidated or sintered at elevated temperatures to form the solid fused-silica body. The product obtained can be in various shapes and sizes which are determined by the dimensions of the container from which evaporation occurs. Since there is considerable shrinkage during evaporation of water and final consolidation, the container must be designed to take this factor into consideration.

The starting material used in making the fused-silica glass of the present invention is an aqueous dispersion of colloidal silica particles. The dispersion is stablized at a pH of between 8–10 with a small amount of alkali or ammonia. The dispersion has an opalescent appearance and typically the viscosity and character of water even though it may contain as much as 40% by weight of silica, but generally the silica content is about 3–30% by weight. The silica particles are colloidal in size and highly hydrated. The particles are in the form of dense, nonporous spheres of high purity silica which is in the noncrystalline form. Stabilization with alkali or ammonia induces a negative charge on the silica surface. It is preferable that stabilization be effected by the use of ammonia since residual alkali metal ions interfere with the subsequent consolidation of the porous gel. However, in one aspect of the present invention this problem may be minimized since during the removal of bound water with gaseous chlorine, alkali chlorides can be removed. Thus alkali, which would be detrimental during consolidation, may be intially present in the colloidal silica dispersion up to 0.05% by weight of total solids during the initial evaporation step.

In a preferred emobdiment of the present invention, the colloidal dispersion of the silica particles was prepared from an alkali silicate solution. Thus, a dilute alkali silicate solution is passed over a cation exchange resin to exchange hydrogen ions for the sodium ions present in the solution. The effluents passing through the column are collected in plastic bottles and the pH raised to about 10 with a high purity ammonium hydroxide solution. Because of the high pH it is recommended to store the silicic acid obtained from the ion exchange procedure in plastic bottles to avoid alkali contamination from the ordinary glass.

The silicic acid solution which is prepared contains monomeric silica or silica chains of low molecular weight. Thereafter, the size of the silica particles are increased to form small silica spheres by refluxing the solution for a period of about an hour or greater while maintaining the pH above 9. The diameter of the spheres after refluxing are in the range of about 50–200 Å. It is assumed that the particles are amorphous since no X-ray diffraction pattern is obtained. The silica concentration is then increased to about 15–25 percent by boiling off excess water while maintaining the pH above 9. The solution should also be stored in plastic bottles.

In general we may consider the process of the present invention to involve three primary steps. Initially, the aqueous dispersion of the colloidal silica particles is subjected to a very careful evaporation procedure to remove most of the water present in the solution. Then the dried gel from which the free water has been removed is subjected to a further treatment to remove the bound water using a gaseous reactant, which in addition may also remove some alkali impurities. Finally the product obtained, which is porous in nature and very similar to leached porous 96% silica glass, is subjected to a sintering or consolidation procedure which resulted in the formation of a fused-silica body. This body is essentially similar in characteristics to that obtained by methods employing flame hydrolysis of silicon tetrachloride.

Perhaps, the greatest care must be exercised in the initial evaporation to reduce the water content of the aqueous dispersion. As the water is removed, the silica particles tend to coalesce and the volume occupied by the dispersion and later the gel is naturally decreased. It is necessary during this shrinkage that the gel have complete freedom of movement. Sticking of the evaporating silica particles or mechanical shock to the dispersion as it is drying usually results in the cracking of the final product. Thus, it is essential that the vessel, in which the evaporation occurs, be lined with a nonsticking inner surface coating that offers no resistance to the gel during shrinkage. We have found that particularly effective coatings are prepared from fluorinated hydrocarbons, such as a polymer of tetrafluoroethylene commercially available under the trademark Teflon. Other materials tried, such as paraffin, rubber, coatings of silicones, and Vaseline, did not give proper release.

Another area in which substantial care must be exercised is in controlling the rate of evaporation especially during periods of greatest shrinkage. Evaporation is carried out by placing the vessel containing the aqueous dispersion of the colloidal particles in a chamber having a controlled relative humidity. In the initial stage of evaporation it is preferable that the relative humidity be from about 60 to 80 percent. As the suspension loses water it progresses from a low viscosity liquid (30 percent silica) to a syrup (about 50 percent silica) to a viscous fluid having the appearance of Vaseline (52 percent silica), a semirigid material appearing like leather (52 to 54 percent silica), and then to a rigid material (55–60 percent silica). Sensitivity to cracking is particularly acute when the percent by weight of silica is in the regions of about 57–64 percent. While further shrinkage takes place between 64–78% silica, sensitivity to cracking appears to increase also in the 73–78% silica range. These primary regions of sensitivity to cracking may be explained by an initial movement of silica spheres closer to one another as water is lost by evaporation and finally an internal shrinkage of the spheres. When the silica content is above 80 percent the tendency to crack is reduced and the body assumes a white appearance. As it increases to about 85–90 percent silica, the body again returns to a transparent condition. Before the gel becomes rigid the various stages of viscosity through which the gel has progressed during drying can be restored merely by the addition of water, but after the gel becomes rigid the process is irreversible.

The concentration of the aqueous dispersion can be taken from 30–45 percent silica quite rapidly and even at elevated temperatures if preferred provided a rigid surface layer is not formed. At higher concentrations of silica the evaporation must be very gradual and may even take many days or weeks. When the gel has stopped losing weight due to water loss, it should then be transferred to a zero percent relative humidity atmosphere to complete the drying.

Hydroxyl ions on the surface of the silica gel, which are referred to herein as bound water, cannot be removed by the evaporation drying technique. If the bound water is not removed, it causes the gel to become expanded and/or devitrified when the solid gel is finally sintered. Two effective techniques for removing hydroxyl ions from the silica gel are impregnation with ammonium fluorides (including ammonium fluoride and ammonium bifluoride) solutions and heating in a chlorine containing atmosphere at elevated temperatures. The chlorine treatment is preferred and may be incorporated in the consolidation steps discussed hereinbelow.

The impregnation with ammonium fluoride is illustrated as follows. Dried silica gel is initially placed in a 100 percent relative humidity atmosphere for a period of about three to four days to prevent the gel from cracking when placed directly in the fluoride solution. The gel is then transferred to an aqueous solution containing about five percent ammonium fluoride at room temperature. Impregnation time generally depends on the dimensions of the samples, with satisfactory results being obtained for example, on a three millimeter thick piece by treating for a period of about two hours. It is believed that the fluoride ions of the solution replace the hydroxyl ions on the surface of the silica gel. After impregnation the gel is dried in a zero percent relative humidity atmosphere.

Finally the silica gel impregnated with ammonium fluoride is sintered to a theoretically dense clear fused silica. The gel is heated at sintering or fusion temperatures, such as up to 800° C. at 100° C. per hour in an air atmosphere and then heated to 1300° C. at 100° C. per hour in a vacuum of less than 2–3 millimeters mercury, and permitted to remain at this temperature for about 30 minutes.

Alternatively the dried porous silica body is treated with a flowing chlorine atmosphere at elevated temperatures of about 600° C. to remove the bound water. Typically the porous body is heated to a temperature of around 600° C. at 50° C. per hour in a vacuum and the sample is then flushed with a chlorine gas. The time of chlorine treatment depends upon the sample thickness, with one hour being quite sufficient for a three millimeter thick piece. When exposure of the sample of the chlorine is for too long a period of time, the dried silica gel may split during sintering. Thereafter, the furnace is evacuated to less than one millimeter of mercury and heated to a temperature of 1200° C. at a rate of 50–100° C. per hour. After a sufficient period of time of about five to eight hours at this temperature the sample is removed from the furnace to give a clear fused silica product. As a precaution the porous silica body should be placed on high purity silica sand while sintering to prevent the body from cracking as it undergoes additional shrinkage. The consolidation procedure, with the chlorine treatment incorporated as a step therein, is found to be superior to the impregnation technique with fluorides followed by a subsequent sintering step. Using the chlorine treatment the gels are less likely to crack, fewer steps are involved, and consequently there is a saving in time, samples are less subjected to handling, and fewer materials and equipment are needed. Another significant advantage is that alkali impurities which tend to interfere in the subsequent sintering of the porous body, can to some extent be removed at elevated temperatures by the formation of volatile alkali halides.

Our invention is further illustrated by the following examples.

EXAMPLE I

A colloidal silica suspension was prepared by diluting 400 ml. of an aqueous sodium silicate solution, which contained 26.4% silica and 8.2% soda, to 4 l. with distilled water. The diluted solution was passed over a hydrogen cation exchange resin (Dowex 50–8X) at a rate of about 20 ml./min. to exchange $H^+$ ions in the resin for $Na^+$ ions in the solution. After discarding the first 600 ml. to pass through the column, a total of 2 to 3 l. of effluent was collected. The pH of the solution was adjusted to above 9.5 with ammonium hydroxide solution prepared by bubbling ammonia gas through distilled water. It was necessary to store the silicic acid in polyethylene bottles to avoid alkali contamination from glass. A typical chemical analysis for alkali and silica content in the stabilized silicic acid solution is given in the table below.

TABLE I

| | Percent in solution |
|---|---|
| $SiO_2$ | 3.42 |
| $Na_2O$ | 0.000014 |
| $K_2O$ | 0.000015 |
| $CaO$ | 0.000013 |

The solution as prepared above consisted of monomeric or low molecular weight silica chains. To increase the size of the particles to small silica spheres, the solution was boiled under reflux for about 1½ hours while maintaining the pH above 9. The diameter of the spheres after refluxing was in the range of 100–200 A., and since no X-ray diffraction pattern was obtained from the particles, it is assumed that they are in the form of amorphous colloidal silica. The silica concentration was then increased to 15% by weight by boiling off excess water while at the same time still maintaining the pH above 9.

A Teflon lined petri dish having a diameter of two inches and a height of a half inch was filled with 36.7 gm. of the stabilized colloidal silica solution. The dish was then placed in a desiccator at room temperature and at a relative humidity of 76%. During evaporation the silica gelled and shrank from the sides and bottom of the dish. After 45 days, the sample weight was 7.9 gm. indicating that the total solids had increased to 66% by weight. The petri dish was then returned to the desiccator under the same conditions for another 27 days and the sample weight was now found to be 6.0 gm. equivalent to total solids of 87%. When the gel stopped losing weight due to water loss, it was transferred to a zero percent R.H. atmosphere to complete the drying for six days and the weight of the sample was then found to be 5.2 gm. equivalent to 99+% total solids. The total linear shrinkage from the solution to the dried gel is typically between 14–37%. This shrinkage is inversely a function of the silica concentration of the initial solution. The bulk density of the dried gel was 0.9 to 1.0 gm./cc. and the alkali content was 0.002% of soda and 0.0004% by weight of potassium. The dried gel in the form of a disk having a diameter of 3.6 cm. and a thickness of 3 mm. had a porous structure with the pore dimensions as follows.

TABLE II

| | Dried silica gel |
|---|---|
| Average pore radius in A.[1] | 25 |
| Percentage of pores within ±3 A. of average | 91 |
| Percentage of pores within ±2 A. of average | 75 |

[1] Determined from BET N₂ adsorption.

The bound water, or more specifically the hydroxyl ions on the surface of the silica gel, could not be removed by drying in a zero percent R.H. atmosphere. If not removed, this bound water causes the gel to become foamed and sometimes devitrified when it is subsequently sintered. In one embodiment of the present invention the bound water is removed by impregnation with ammonium fluoride solution. The dried gel was first placed in a 100% R.H. atmosphere for four days. It was then treated for two hours with an aqueous 5% ammonium fluoride solution at room temperature whereby the fluoride ions replaced hydroxyl ions on the surface of the porous silica body. After impregnation, the gel is again dried in a zero percent R.H. atmosphere. The treated silica gel is then sintered to a theoretically dense, clear fused silica. The gel was heated to 800° C. at 100° C. per hour in an air atmosphere, then heated to 1300° C. at a rate of 100° C. per hour in a vacuum of less than 2–3 mm. of Hg and permitted to remain at this temperature for one half hour. The consolidated gel is similar to fused silica prepared by the flame hydrolysis of silicon tetrachloride and has a density of 2.2 gm./cc. equivalent to the theoretical value for fused silica.

EXAMPLE II

Following the procedure of Example I, a dried porous silica gel in the form of a disk was prepared. The gel was then subjected to an alternative treatment using gaseous chlorine to remove bound water. This was done by altering the firing schedule of Example I and removing the surface hydroxyl ions at an intermediate temperature of about 600° C. Using a furnace with a three-inch diameter and three-foot long mullite tube closed at one end and having a gas tight fitting adapted to permit flushing with a gaseous atmosphere, the silica gel disk was placed on a high purity silica sand. The disk was then heated to a temperature of 600° C. at 50° C. per hour in a vacuum of 1 mm. of Hg and then while at 600° C. the sample was flushed with gaseous chlorine at a flow rate of 80–90 cc./min. The chlorine treatment was continued for a period of one hour which was quite sufficient. While the time of treatment is dependent upon the dimensions of the porous silica body, extended exposure to the chlorine gas is not recommended since the gel tends to split during sintering. The furnace was then again evacuated to less than 1 mm. of Hg vacuum and heated to 1200° C. at 50–100° C. per hour. After a period of 5–8 hours at this temperature the samples were removed from the furnace. The product obtained was substantially equivalent to that of Example I.

It will be apparent to those skilled in the art that many variations and modifications of the invention as hereinabove set forth may be made without departing from the spirit and scope of the invention. The invention is not limited to those details and applications described, except as set forth in the appended claims.

We claim:
1. A method of making a fused silica article comprising the steps of:
   (a) evaporating at a relative humidity of 0–80%, from a container having a nonsticking surface, the free water of an aqueous dispersion of colloidal silica particles, said dispersion having a maximum alkali content of 0.05% by weight of total solids, whereby a solid porous body of silica is formed;
   (b) impregnating the porous body with a reagent containing a halogen selected from the group consisting of chlorine and fluorine to remove bound water from said body; and
   (c) consolidating the porous body at an elevated temperature sufficient to sinter said body such that a fused silica article having a nonporous structure is produced.
2. The method of claim 1, wherein the dispersion is stabilized with ammonia and contains about 3–30% by weight of silica.
3. The method of claim 1, wherein said particles are substantially spherical and have a diameter of about 50–200 A.
4. The method of claim 1, wherein said container has a lining of a polymer of tetrafluoroethylene.
5. The method of claim 1, wherein the evaporation occurs under a controlled relative humidity atmosphere, said atmosphere being initially in the range of 60–80% R.H. and finally at a 0% R.H.
6. The method of claim 1, wherein said reagent is a dilute aqueous solution of an ammonium fluoride selected from the group consisting of ammonium fluoride and ammonium bifluoride.
7. The method of claim 1, wherein the porous body is treated with a flowing chlorine atmosphere at elevated temperatures of about 600° C. to remove surface hydroxyl groups.
8. The method of claim 1, wherein said consolidating is at elevated temperatures from 1200° C.–1300° C. and under a vacuum.
9. The method of claim 1, wherein said evaporating step occurs at ambient temperatures.

References Cited

UNITED STATES PATENTS

| 2,883,347 | 4/1959 | Fisher et al. | 65—18 XR |
| 3,010,839 | 11/1961 | Drumheller et al. | 65—18 XR |
| 3,086,898 | 4/1963 | Alford et al. | 65—18 XR |

FOREIGN PATENTS

| 822,868 | 11/1959 | Great Britain. |

S. LEON BASHORE, Primary Examiner

J. H. HARTMAN, Assistant Examiner

U.S. Cl. X.R.

65—31, 32